United States Patent [19]

Proper

[11] Patent Number: 5,298,737
[45] Date of Patent: Mar. 29, 1994

[54] MEASURING APPARATUS FOR DETERMINING THE POSITION OF A MOVABLE ELEMENT WITH RESPECT TO A REFERENCE

[76] Inventor: R. J. Proper, Haarlemmerweg 77, 2334 GE Leiden, Netherlands

[21] Appl. No.: 937,402

[22] Filed: Aug. 31, 1992

[51] Int. Cl.$^5$ .............................................. G01V 9/04
[52] U.S. Cl. ..................................... 250/221; 345/180
[58] Field of Search ............ 250/221, 222.1, 234–236, 250/561; 340/706, 707, 709; 356/5

[56] References Cited

U.S. PATENT DOCUMENTS

| | | | |
|---|---|---|---|
| 3,924,107 | 12/1975 | Sakai | 235/150 |
| 4,688,933 | 8/1987 | Lapeyre | 340/707 |
| 4,762,990 | 8/1988 | Caswell et al. | 250/221 |
| 4,811,004 | 3/1989 | Person et al. | 250/221 |
| 4,851,616 | 7/1989 | Wales et al. | 250/221 |
| 4,949,079 | 8/1990 | Loebner | 340/706 |
| 5,012,049 | 4/1991 | Schier | 340/707 |
| 5,073,770 | 12/1991 | Lowbner | 340/706 |
| 5,126,513 | 6/1992 | Wang et al. | 340/709 |
| 5,164,585 | 11/1992 | Lieu | 250/221 |

FOREIGN PATENT DOCUMENTS

| | | |
|---|---|---|
| 0202468 | 11/1986 | European Pat. Off. . |
| 0366112 | 5/1990 | European Pat. Off. . |
| 0064581 | 4/1983 | Japan ........ 340/707 |

Primary Examiner—Michael Messinger
Attorney, Agent, or Firm—Nixon & Vanderhye

[57] ABSTRACT

A measuring apparatus for determining the position of a movable element with respect to a pair of spaced reference means, e.g. mirrors, rotatable around parallel shafts. The movable element emits a light beam from a position to both mirrors. As a result of the rotation, the two mirrors convert the reflected light beam into a light pulse series. Each of these light pulse series is detected by a detector, which detected light pulse series are supplied to a processing unit for calculating from the light pulse series and from a starting pulse the position of the movable element with respect to both mirrors.

5 Claims, 3 Drawing Sheets

MEASURING APPARATUS FOR DETERMINING THE POSITION OF A MOVABLE ELEMENT WITH RESPECT TO A REFERENCE

BACKGROUND OF THE INVENTION

This invention relates to a measuring apparatus for determining the position of a movable element with respect to at least two spaced reference means, which movable element can emit a propagation energy wave to be received by the reference means, the propagation energy wave received being passed from each of the reference means to a processing unit for determining the position of the movable element with respect to the reference means.

Such a measuring apparatus for determining the position of the movable element with respect to the reference means is known per se. For this purpose, the movable element emits a sound wave which is received by a pair of spaced reference means in the form of Microphones. From the difference in propagation time of the sound wave from the movable element to each of the microphones the position of the movable element is determined by means of a processing unit.

A drawback of such a measuring apparatus operating on sound waves is that the sound waves require a medium, such as air, to be able to propagate. Thus, for instance, air displacement, e.g. draught, will affect the direction of sound displacement as well as the sound volume. Furthermore, sound waves are susceptible to temperature differences, as the propagation speed is proportional to the ambient temperature. Therefore, draught and ambient temperature adversely affect the correctness of the measurement.

A further drawback is that the microphones will detect not only the sound waves from the movable element but all other sound waves, e.g. sounds of human voices, machines etc.

As the measurements are generally conducted under conditions at which the above drawbacks are often more or less present, such a measuring apparatus is not always equally accurate, and the inaccuracy will certainly increase as the distance from the movable element to the microphones increases.

Another drawback of this known measuring apparatus is that the sound waves are generally obtained by induction waves, which implies a relatively high induced electromotive force. As such an induced electromotive force may negatively affect the operation of adjacent electronic devices, the induction-producing circuit is supplied as a separate unit, which is laborious. Moreover, under certain conditions a measurement with sound waves is not useful, e.g. when the movable element is scanning an object in the form of a printed circuit board. The fact is that induction waves may adversely affect the electronic devices of the printed circuit board.

SUMMARY OF THE INVENTION

It is therefore an object of the invention to provide an improved measuring apparatus which essentially removes the drawbacks.

This object is achieved in that according to the invention the reference means are rotatable propagation energy wave-reflecting surfaces, which rotate in opposite directions and that each of the reflecting surfaces cooperates with a detector to detect the propagation wave energy reflected by the reflecting surfaces and supply it to the processing unit for calculating the position of the movable element.

With the measuring apparatus according to the invention it is achieved that, by using propagation energy wave-reflecting surfaces preferably in the form of mirrors, which propagation energy wave is, e.g., a laser beam, the measuring apparatus has become insusceptible to disturbing influences. In fact, a light beam propagates independently of the medium through which the light passes and is therefore insusceptible to temperature changes, light displacements etc. Also at great distance a light beam can be very accurately received by the mirrors. A very low voltage suffices to generate a light beam. Consequently, the circuit which is to supply such a low voltage can without any problem be mounted on, e.g., an insert card and be incorporated in the processing unit. A separate voltage-supplying circuit is no longer necessary then.

For calculating the position of the movable element by means of the rotary mirrors use is made, according to the invention, of the fact that the distance from this element to each of the reflecting surfaces with respect to the initial moment at which this element emits, e.g., a light beam, is a function of the phase shift with respect to the light wave pulses of a series of light wave pulses supplied by one mirror and a series of light wave pulses supplied by the other mirror, which series of light pulses result from the rotation of the mirrors, and is also a function of the amount of the rotational speed.

In order to calculate as reliably as possible, it is desirable that the rotational speed of both mirrors be the same, i.e. that in each angular position the mirrors rotate in mirror-symmetrical relationship with each other. Such an accurate rotation, however, considerably increases the constructional requirements of the measuring apparatus. Yet also in case of some difference in rotational speed a highly accurate measurement can be obtained by means of the pulse series over a great many revolutions.

This rotation problem, however, can be solved according to a preferred embodiment of the invention by providing a starting pulse generator for emitting also a propagation energy wave of, e.g., the same type as that of the movable element, and which starting pulse generator is located such that the propagation energy wave emitted by the starting pulse generator is reflected by the reflecting surfaces into a rotational position, which reflected propagation energy wave can be detected by the detectors cooperating with the reflecting surfaces, the position of the movable element to each of the reflecting surfaces being calculable by the processing unit from the traversed angle between a pair of angular positions of the reflecting surfaces, the propagation energy wave of the starting pulse generator being detected in one angular position and the propagation energy wave of the movable element in the other angular position, the traversed angle being a measure for the distance from the movable element to the reflecting surfaces.

The advantage of this embodiment is that the measurement has become independent of the rotational speed of the reflecting surfaces and that it is further unessential that the rotational speeds of both reflecting surfaces must be equal, and also that the reflecting surfaces always rotate in mirror-symmetrical relationship with each other.

A further advantage is that the reliability of the measurement has considerably increased. Moreover, the measuring distance from the movable element to the reflecting surfaces may considerably increase, and when a laser beam is used, the measuring distance can in principle be measured as far as the horizon.

BRIEF DESCRIPTION OF THE DRAWING FIGURES

The invention will be described in more detail hereinafter with reference to the accompanying drawings in which.

DESCRIPTION OF A PREFERRED EMBODIMENT

Figure 1:
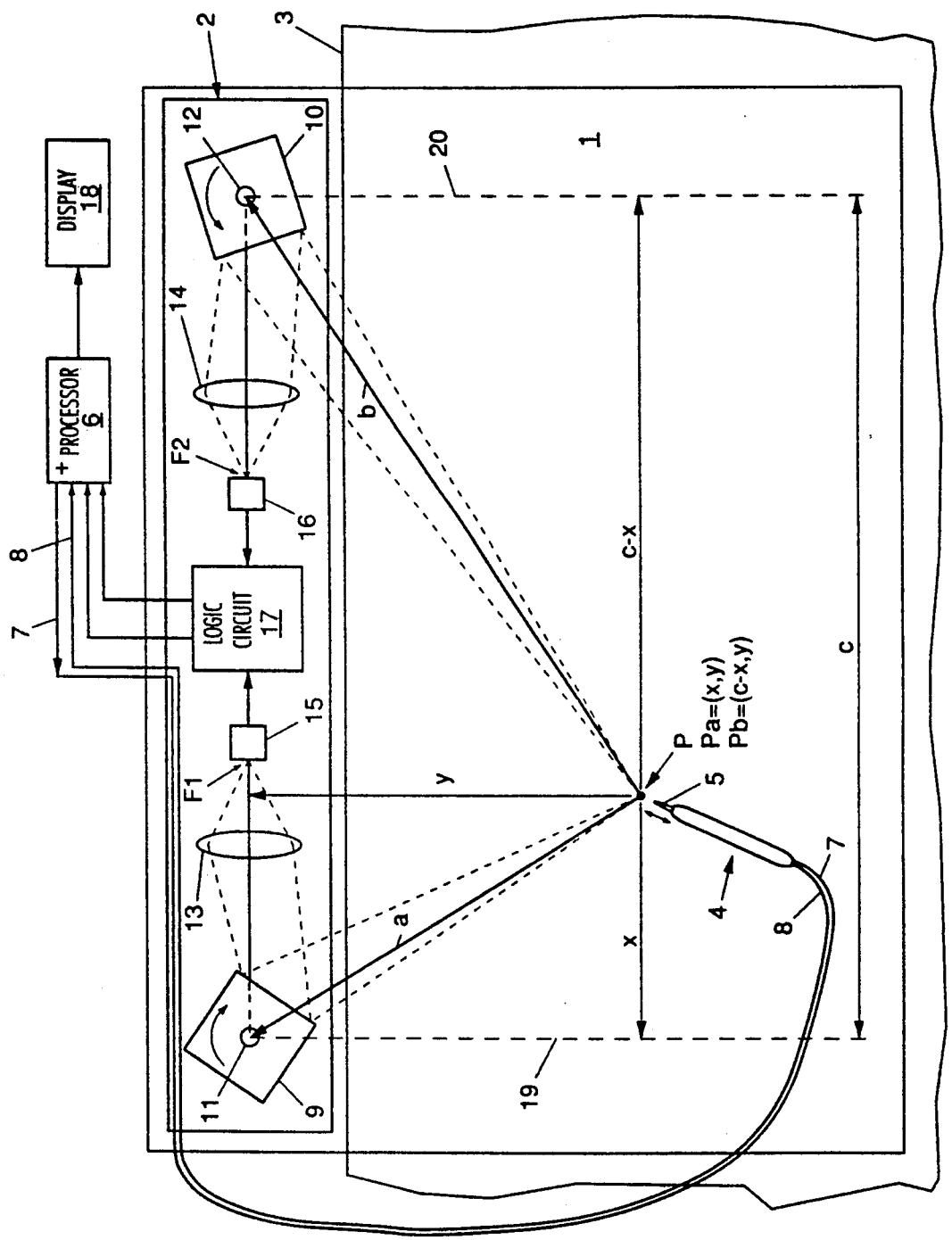
FIG. 1 is a practical example of the measuring apparatus.

The embodiment shown in FIG. 1 comprises a base plate 1 and a housing 2 mounted thereon on a longitudinal side of the base plate. The part of base plate 1 projecting from housing 2 may serve as information surface, e.g. by providing it with information relevant for the measurement, such as a function division, system of axes, etc. (not shown) for an object 3 to be measured, which is suitably placed under base plate 1. This object may be a printed circuit board, a document or otherwise.

By means of a movable object, e.g. in the form of a pen-shaped holder 4, the object 3 can be scanned. For this purpose, holder 4 comprises a pen 5 depressible with respect to the longitudinal direction thereof. Provided in pen 5 is, e.g. a laser source (not shown), which comes into action after depressing pen 5. The voltage required for the laser source can be supplied to holder 4 from a processing unit 6 via a cable 7, in which holder a on-and-off circuit (not shown) is disposed for switching on the laser source, e.g. at the moment when pen 5 is pressed on object 3. Simultaneously with the light energy emitted by the laser source a starting signal is supplied to processing unit 6 via the on-and-off circuit and a cable 8.

The light energy emitted is received by a pair of mirrors 9 and 10 rotating in opposite directions. These mirrors are accommodated in housing 2, in which they are spaced, each rotating about shafts 11,12, which are parallel to each other. The light beams a and b received by mirrors 9 and 10 are reflected by the mirrors and are each converged to points $F_1$, $F_2$ through correction lenses 13 and 14. Disposed at these points $F_1$ and $F_2$ are photosensitive detectors 15,16, by which light beams a and b can be detected which, by means of a known per se logic circuit 17, are supplied to processing unit 6 for calculating position P of pen 5 on the object with respect to both mirrors serving as reference means.

The rotation of the mirrors will result in that the light beams reflected by the mirrors in the form of light pulses are supplied to detectors 15 and 16. Each of the mirrors therefore supplies a series of light pulses. Depending on the position of the pen, these series of light pulses will be more or less phase-shifted with respect to each other. From these phase-shifted light pulse series and from the starting signal the coordinates of point P can be determined in the known manner by processing unit 6 on the movable element with respect to each of the mirrors. For mirror 9 this would be, as shown in FIG. 1, $P_a$ (x,y) and for mirror 10 $P_b$ (c−x,y), c being the distance between the two mirrors, and the dashed lines 19 and 20 being taken as boundary lines, within which the position of the movable elements 4,5 can be determined. It will be clear, however, that the position of the movable element can also be determined outside these boundary lines 19 and 20, i.e. within those boundaries within which the mirrors are still capable of reflecting the light to the detectors. For positions to the left of line 19, however, a negative value should then be selected for x. The coordinates calculated by processing unit 6 may be shown, e.g. on a display 18, or may be stored in a memory for further use.

By constantly displacing the movable element 4,5 the object 3 can be scanned und thus all scanned points can be determined.

Figure 2:
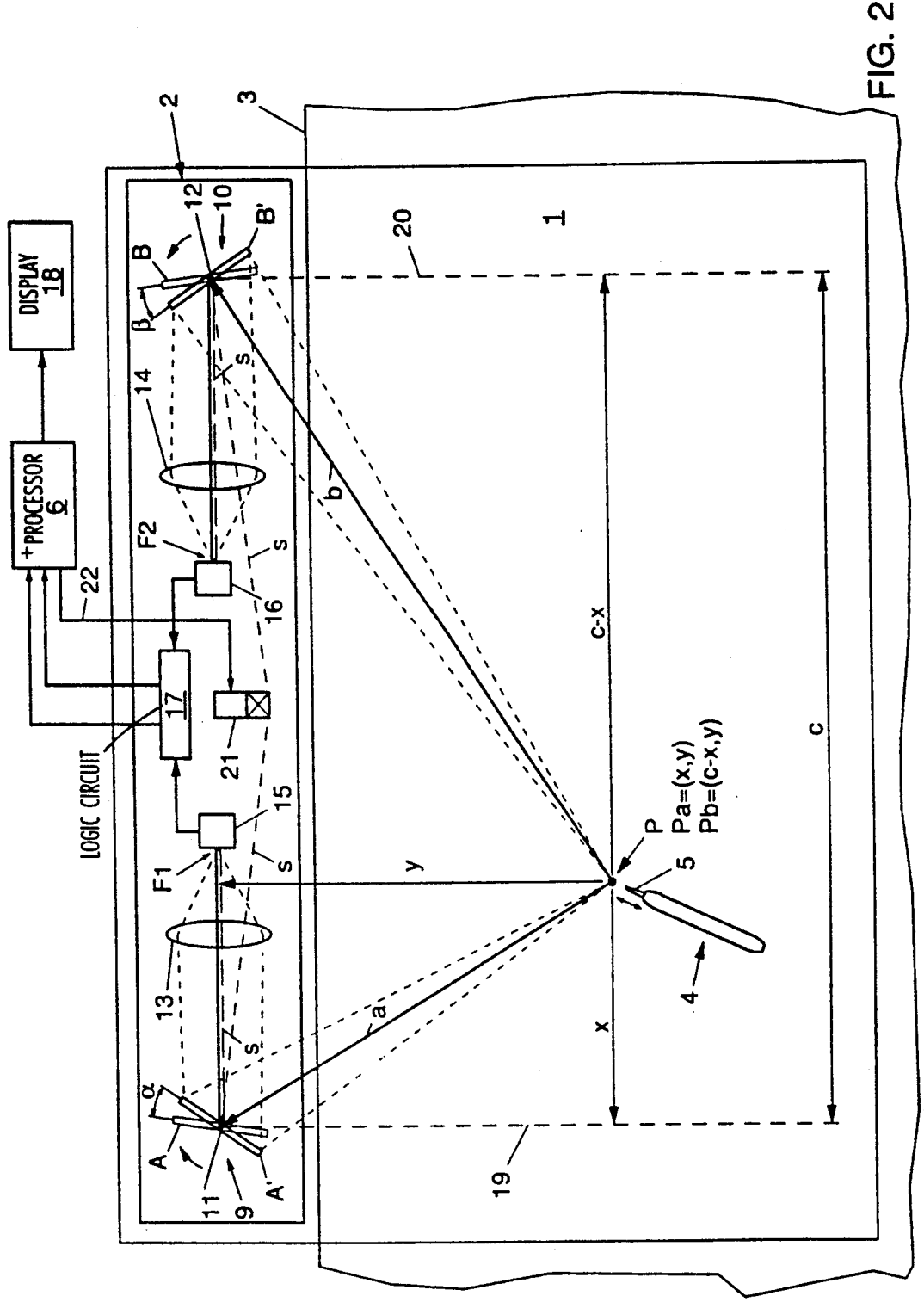
FIG. 2 is a modification of the practical example of the measuring apparatus of FIG. 1.

FIG. 2 shows a practical example of the measuring apparatus which bears a close resemblance to that of FIG. 1. In this embodiment, however, the starting point for the calculation is different. The calculation is based on the angular displacement of mirrors 9 and 10 from a selected first angular position to a second angular position, which depends on the position of movable element 4 on object 3. To achieve this, there is accommodated in housing 2 a starting pulse generator 21 for generating and emitting a propagation energy wave of the same type as that of pen 5. The operation of the starting pulse generator can be controlled from processing unit 6 through line 22.

Figure 3:
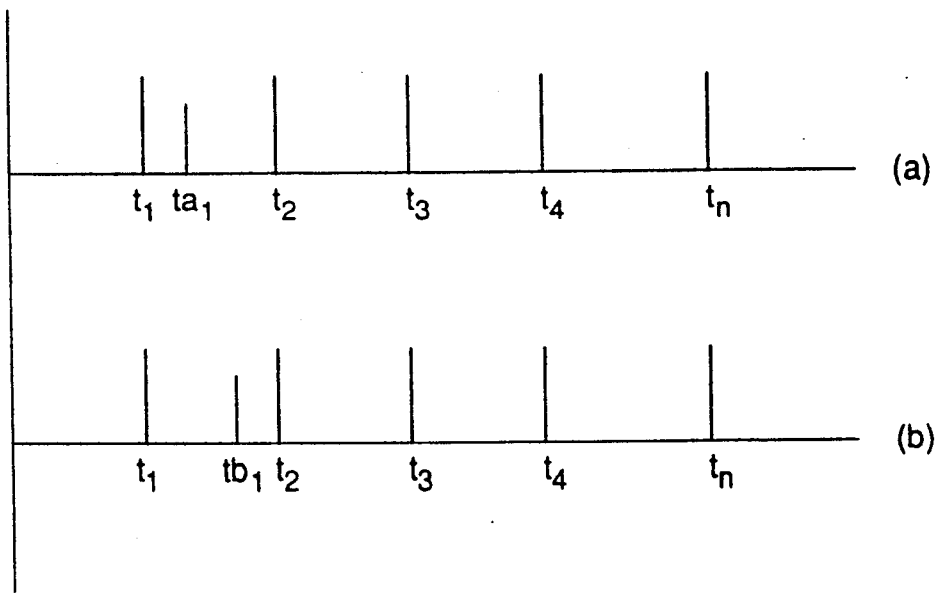
FIG. 3 is a diagram for further explanation of FIG. 2.

The starting pulse generator preferably lies near the common plane of the rotary shafts 11 and 12, e.g. at the midpoint between these shafts and in such a manner that the propagation energy wave emitted by the starting pulse generator, e.g. in the form of a laser beam, reflected by mirrors 9 and 10 in preselected angular positions A and B, respectively, can be detected by detectors 15 and 16. The rotation of the mirrors will result in that at each revolution of the mirrors in the preselected angular positions A,B the detectors receive a light pulse from the starting pulse generator. Therefore, a series of pulses is formed used as starting pulses $t_1 \ldots t_n$ (see FIG. 3a,b) for the calculation of the coordinates of point P.

When mirrors 9 and 10 reach the angular positions A' and B', respectively, the light beam emitted by pen 5 from point P is detected by detectors 15 and 16 in the form of pulses $t_a$ and $t_b$, respectively. From the difference $t_1-t_1$ and $t_{b1}-t_1$, which is a measure for the traversed angle $\alpha$ and $\beta$, respectively, between the preselected angular positions A, B and the angular positions A' and B', respectively, the coordinates of P can be calculated by the processing unit.

It will be clear that when the mirrors used are reflective on both sides, the detection of the light beams takes place at each half-revolution of the mirrors.

A further difference with the embodiment of FIG. 1 lies in that the starting cable 8 is no longer necessary, since the function thereof has been adopted by the starting pulse generator 21. By incorporating into holder 4 a storage battery, not shown, as energy source for the light beam to be emitted, cable 7 can also be left out. Holder 4 has therefore become rather movable, which is a pleasant additional fact if point P is to be recorded over a somewhat longer distance from the measuring apparatus; in fact, over a longer distance cables 7 and 8 may be considered troublesome.

The reference means used in the selected embodiments are plane mirrors which are reflective on one or both sides. It will be clear that other forms may also be used, e.g. cylindrical means, of which the planes of cross-section perpendicular to the rotary shafts 11,12 are squares and of which each of the vertical sides of the cylinder surface is a reflective surface, or in general forms with planes of cross-section which are polygons and of which the number of sides is $n>2$.

If desired, the correction lenses 13,14 used in the given embodiments may be left out. In that case, however, the amount of light received by the detectors will be considerably reduced. This need not be a drawback if the laser source and the photosensitive detector are properly selected.

In order to avoid that false light is received by the detectors, a guard tube (not shown) may be provided around the beam of reflected light between the mirrors and the associate detectors.

Instead of a laser source, an infrared source may be disposed both in pen 5 and in starting pulse generator 21, but then the detectors must be suitable for detecting the infrared portion of the light energy wave. An advantage of infrared light is that ambient light does not affect the measurement, although a properly selected intensity of the laser source may also rule out any disturbing influence of ambient light.

I claim:

1. An apparatus for determining the position of a movable element comprising:
    at least two spaced reflecting surfaces rotatable in opposite directions;
    a pair of detectors;
    a processing unit;
    each of the reflecting surfaces being cooperable with one of said detectors to reflect propagation wave energy received by said reflecting surfaces to said one detector for generating a signal and supplying it to said processing unit;
    a starting pulse generator for emitting a reference propagation energy wave, which starting pulse generator is located such that the reference propagation energy wave emitted by the starting pulse generator is reflected by said reflecting surfaces, when said reflecting surfaces lie in a first rotational position, for detection by said detectors cooperating with the reflecting surfaces and for generating signals for transmission to said processing unit, the position of the movable element relative to each of said reflecting surfaces being calculable by said processing unit from traversed angles $\alpha$ and $\beta$ between a pair of angular positions of the reflecting surfaces, the reference propagation energy wave of the starting pulse generator being detected by said detectors in one angular position of said reflecting surfaces and the propagation energy wave of the movable element being detected by said detectors in the other angular position, the traversed angles $\alpha$ and $\beta$ being a measure of the position of the movable element relative to the reflecting surfaces.

2. An apparatus according to claim 1 characterized in that the referenced propagation energy wave and the propagating energy wave of the movable element are light energy waves.

3. An apparatus according to claim 2 wherein the light energy waves comprise a laser beam.

4. An apparatus according to claim 1 wherein the light energy waves comprise infrared waves.

5. An apparatus according to claim 1 including a correction lens between each reflecting surface and a corresponding detector such that at least part of the propagation energy waves reflected by the reflecting surfaces are converged to the detectors.

* * * * *